May 8, 1962 J. SCHMIER ETAL 3,034,084
CUBE TAP
Filed March 10, 1958 5 Sheets-Sheet 1

INVENTORS
JACOB SCHMIER
JOHN C. TIMMINS
BY
ATTORNEYS

May 8, 1962   J. SCHMIER ETAL   3,034,084
CUBE TAP
Filed March 10, 1958   5 Sheets-Sheet 2
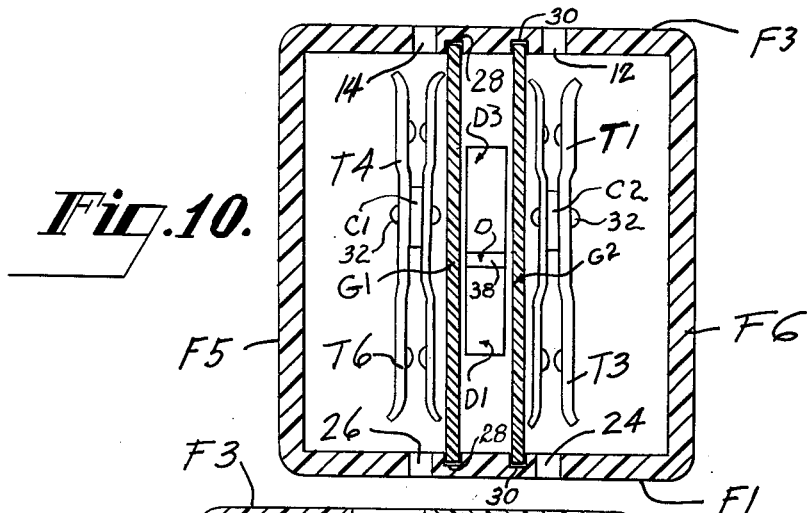
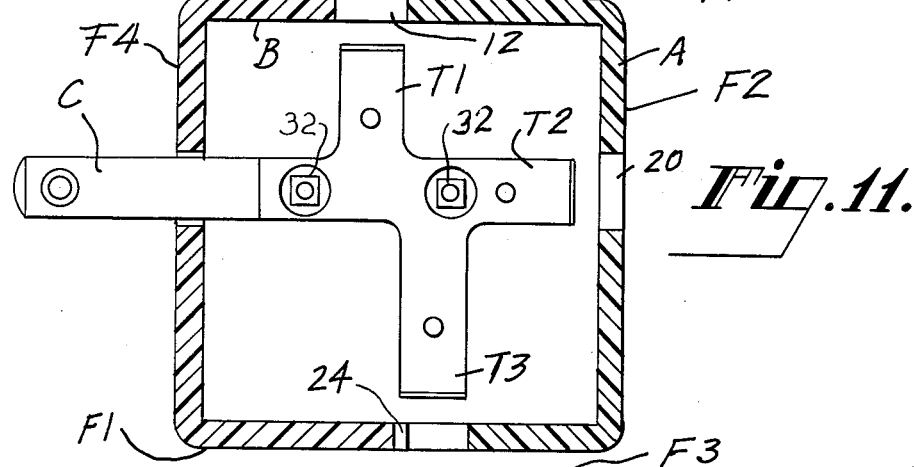
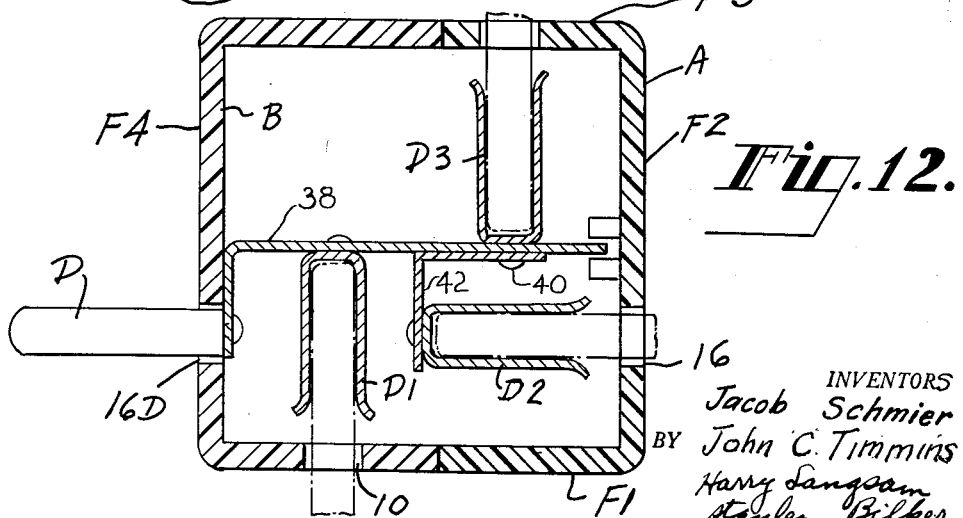
INVENTORS
Jacob Schmier
John C. Timmins
Harry Langsam
Stanley Bilker
BY
ATTORNEYS May 8, 1962 J. SCHMIER ETAL 3,034,084
CUBE TAP
Filed March 10, 1958 5 Sheets-Sheet 3

INVENTORS
Jacob Schmier
BY John C. Timmins
Harry Langsam
Stanley Bilker
ATTORNEY May 8, 1962  J. SCHMIER ET AL  3,034,084
CUBE TAP Filed March 10, 1958  5 Sheets-Sheet 4

INVENTORS
JACOB SCHMIER
JOHN C. TIMMINS

BY
ATTORNEYS

May 8, 1962  J. SCHMIER ETAL  3,034,084
CUBE TAP

Filed March 10, 1958  5 Sheets-Sheet 5

INVENTORS
JACOB SCHMIER
JOHN C. TIMMINS

BY *Harry Langham*
*Stanley Bilker* ATTORNEYS

United States Patent Office 3,034,084
Patented May 8, 1962

3,034,084
CUBE TAP
Jacob Schmier and John C. Timmins, Allentown, Pa., assignors to Rodale Manufacturing Co., Inc., Emmaus, Pa., a corporation of Pennsylvania
Filed Mar. 10, 1958, Ser. No. 720,174
3 Claims. (Cl. 339—14)

Our invention relates to a cube tap and relates more particularly to a cube tap wherein there are provisions for a ground connection. The cube tap of this invention is of substantially the same size as the cube taps ordinarily used.

Heretofore, cube taps have not been utilized with a ground connection and since the cube tap should be small in size, it is important that the current carrying terminals and the ground connectors be properly spaced, in order that the size of the cube tap should not be unduly large.

It therefore, is an object of our invention to provide a cube tap wherein provisions may be made to insert a cube tap in a receptacle having provision for a ground connection, and wherein three additional plug attachments, each having two "live" terminals and one grounded terminal may be connected thereto.

Another object of our invention is to provide a cube tap wherein good electrical connections will be made with a grounded electrical convenience outlet or a grounded receptacle.

Another object of our invention is to porvide a multi-outlet cube tap for connection to a single, grounded outlet, whereby three grounded electrical circuits having prearranged terminals as to configuration and size may be electrically connected to the multi-outlet.

Another object of our invention is to provide a cube tap with a ground connection having three outlet connections wherein the cube tap may be inserted in a two outlet convenience wall receptacle wherein the three cube tap outlets may be used.

Another object of our invention is to provide a cube tap with a ground connection having three outlet connections wherein two cube taps may be inserted in the two outlets of a convenience wall receptacle whereby six cube tap outlets are available for use.

Other objects of our invention are to provide an improve device of the character described, that is easily and economically produced, which is sturdy in construction, and which is highly efficient in operation.

With the above and related objects in view, our invention consists in the details of construction and combination of parts, as will be more fully understood from the following description, when read in conjunction with the accompanying drawings, in which:

FIG. 10 is a fragmentary sectional view showing the "live" circuit contacts.

FIG. 11 is a fragmentary sectional view taken along the line 11—11 of FIG. 3.

FIG. 12 is a sectional view taken along the line 12—12 of FIG. 2.

Figure 1:
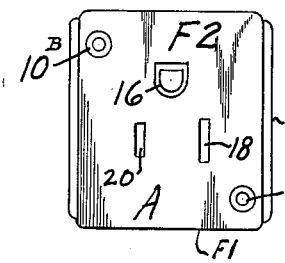
FIG. 1 is an end view of a tri-plug embodying our invention.

Referring to the drawings, wherein similar reference characters refer to similar parts, we show a multi-outlet or tri-plug or cube tap which is an electrical device to be inserted into an electrical receptacle having a ground terminal whereby cube tap terminals C1, C2 engage the live terminals of a tandem blade circuit and wherein there is a ground connection D.

Figure 15:
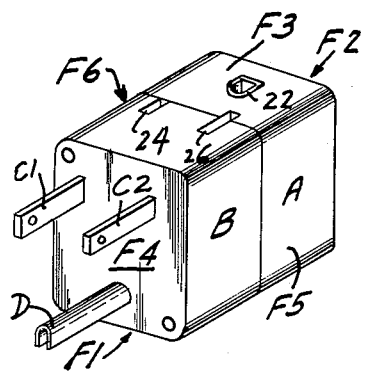
FIG. 15 is the cube tap turned 180° along another side.

The top molded cavity, generally designated as A, interfits with a supplementary bottom cavity, generally designated as B, to form the shell for the multi-outlet. The outside faces of the cube tap, when assembled, has been designated as F1, F2, F3, F4, F5 and F6. The face F4 (FIG. 15) has two terminals C1 and C2 and a ground terminal D projecting therefrom.

Figure 18:
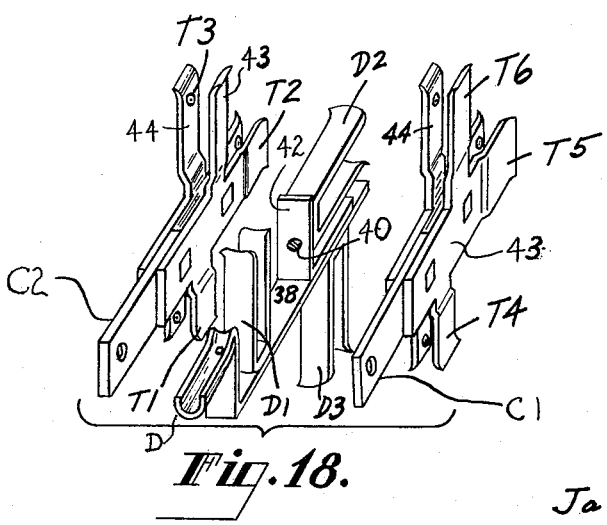
FIG. 18 is an exploded view of the terminals and ground connection.
Figure 19:
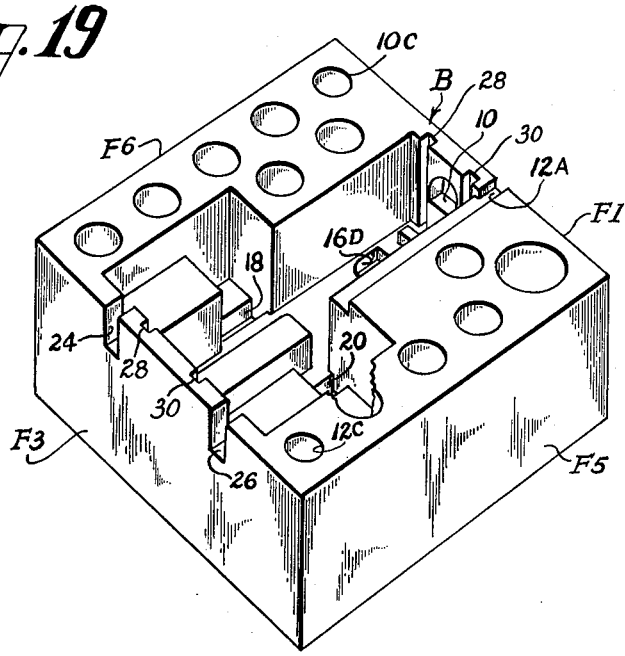
FIG. 19 is a perspective view of one molded casing which forms the top portion of the tri-plug.
Figure 20:
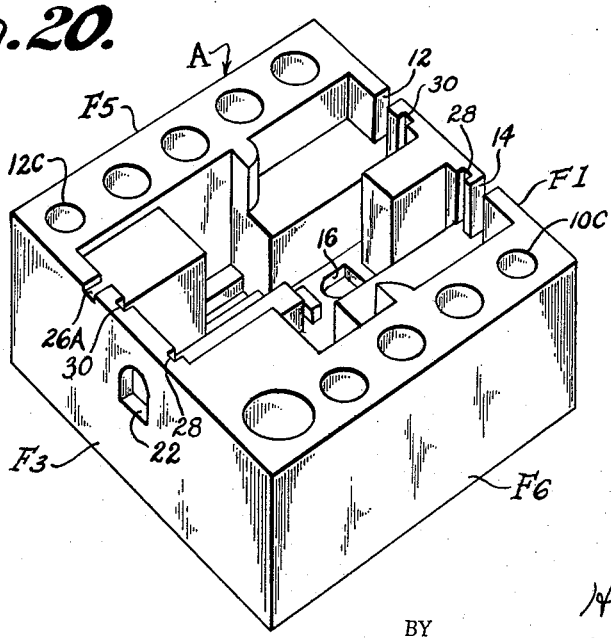
FIG. 20 is a perspective view of the bottom casing of the tri-plug.

Within the cavities A and B, there are suitable chambers for housing the interconnected terminals T1, T2 and T3 which serve as one live side of the circuit and the other live side of the circuit has the interconnected terminals T4, T5 and T6 (FIG. 18). The interconnected ground terminals are designated as D1, D2 and D3, which are electrically connected to the U-shaped ground prong D.

Figure 16:
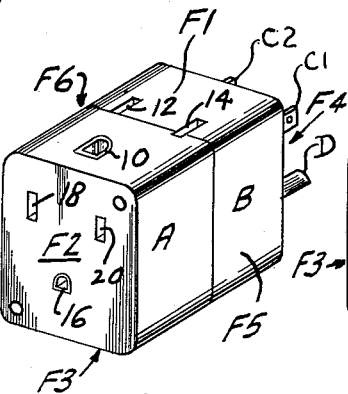
FIG. 16 is a view of the cube tap looking from the front end.
Figure 17:
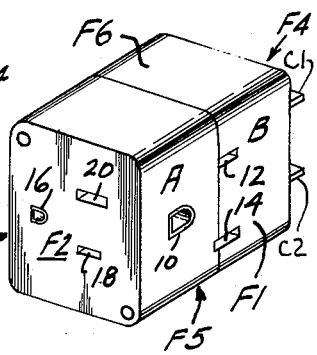
FIG. 17 is a view of the cube tap turned another 90°.

Upon the face F1, there is a provision for openings 10, 12 and 14. The D-shaped opening 10 is adapted to receive a connector wherein there is a ground contact and the openings 12 and 14 are adapted to receive the terminals for the live side of the circuit. The face F2 (FIG. 16) has openings 16, 18 and 20 therein, with the D-shaped opening adapted to receive the ground terminal of a plug connector and the parallel rectangular openings 18 and 20 being adapted to receive the prongs of the live side of the circuit. The face F3 (FIG. 15) of the cavities A and B has openings 22, 24 and 26 therein wtih the D-shaped opening adapted to receive a ground terminal from a plug.

It is to be observed that the opening 12 in the face F1 (see FIG. 13) of the cavities has a portion of the opening 12A in the bottom section B and an aligning portion in the upper cavity A.

Figure 6:
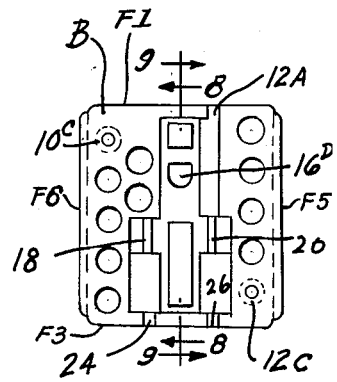
FIG. 6 is a view of the other shell or casing taken along the line 6—6, of FIG. 2.
Figure 7:
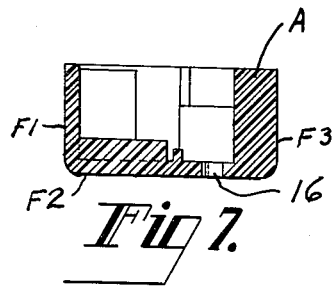
FIG. 7 is a sectional view taken along the line 7—7 of FIG. 5.
Figure 13:
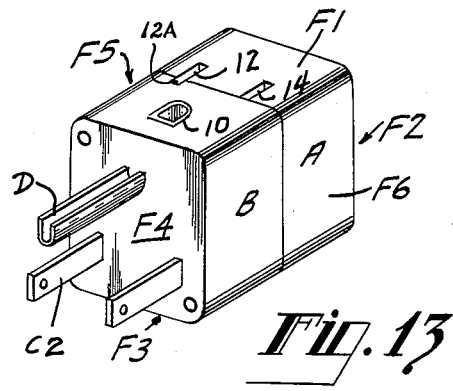
FIG. 13 is a perspective view of the cube tap.
Figure 14:
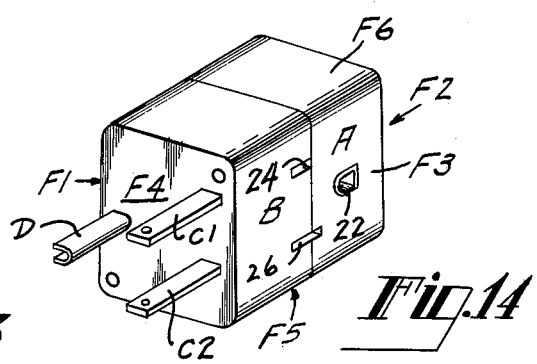
FIG. 14 is the cube tap turned 90° to one side.

The recess 12A in the bottom B (FIG. 6) is a portion of the recess 12 as shown in FIG. 13.

Figure 8:
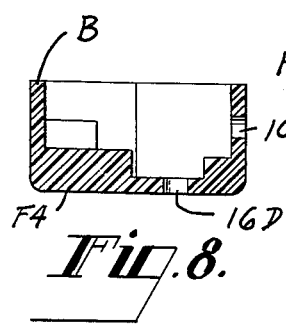
FIG. 8 is a sectional view taken along the line 8—8 of FIG. 6.
Figure 9:
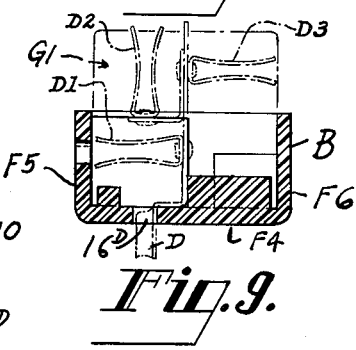
FIG. 9 is a sectional view taken along the line 8—8 of FIG. 6, with ground contacts shown in position in dotted lines.

In the bottom cavity B (FIGS. 6, 8 and 9) the D-shaped openings 16D permits the ground prong D to project therefrom.

The two cavities A and B of the cube tap are held together by at least two screws designated as 10B and 12B which pass through openings 10C and 12C in the shell A and B.

The interior of each shell has complementary mirror image parts to align the terminals T1, T2, T3 and the prong C1 in one plane; the terminals T4, T5, T6 and the prong C2 in another plane and the ground connections D, D1, D2 and D3 in a third plane.

In FIG. 10 is shown two fiber arc barriers, each of which is designated as G. Between the fiber arc barriers G1 and G2, is located the grounding contacts. The barriers are of the construction as indicated in FIG. 10 and are held within recesses on the interior of the casings. Between the barriers G1 and G2 are the grounding contacts D1, D2 and D3, as shown in FIG. 10. To one side of the barrier G2 are the terminals T1, T2 and T3. One side of the barrier G1 and the face F2 are the terminals T4, T5 and T6. The terminals T1 and T2 show that they may be of a double wiping contact and they may be held together by virtue of rivets 32. The recesses in the casing wherein the fiber arc barriers are held are designated as 28 and 30 respectively.

It is to be noted that the grounding contacts and terminals are correlated in such fashion that the cube tap is of small size and provides adequate spacing between the terminals so that there will be no arcing between the terminals and the grounding and furthermore that all the members provide for ready access to one another.

Under certain conditions it may be desirable to have the terminals arranged so that they lie in the same plane instead of in parallel planes such as shown in FIG. 13 as an example.

Figure 2:
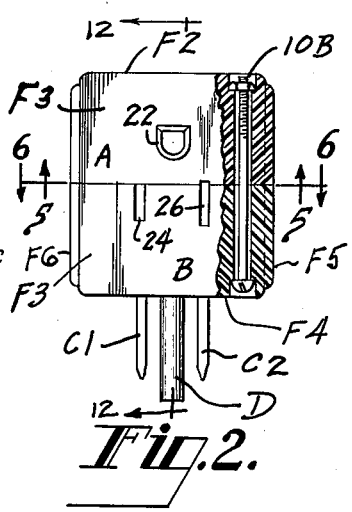
FIG. 2 is a side view showing the tri-plug illustrated in FIG. 1.
Figure 3:
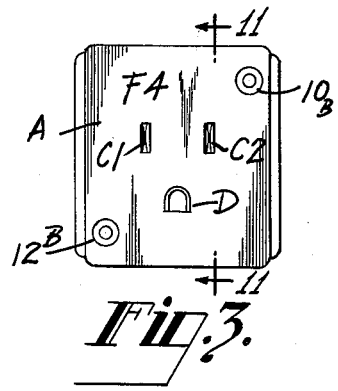
FIG. 3 is another end view of the tri-plug.
Figure 4:
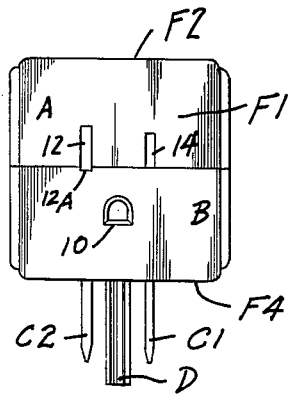
FIG. 4 is another side view of the tri-plug.
Figure 5:
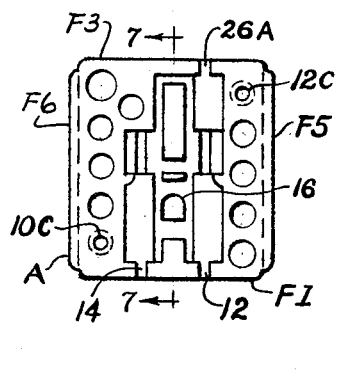
FIG. 5 is a view of one shell or casing taken along the line 5—5 of FIG. 2.

In the arrangement of the conventional wall convenience outlet J, the holes on the outlets J1 and J2 for the reception of the cube tap prongs usually are arranged to lie in the same plane. When the cube tap illustrated in FIG. 2, is used, then one of the outlets of the cube tap would not be readily available when two cube taps are used in the two outlets J1 and J2 (FIGS. 2 and 21) of the convenience receptacle J, such as that sold by Rodale Manufacturing Company, which is catalog No. 572. We therefore provide in FIG. 21 an auxiliary intermediate connection which is designated as G wherein the cube tape may be rotated 90° with respect to the wall convenience outlet receptacle J1 or J2.

Figure 21:
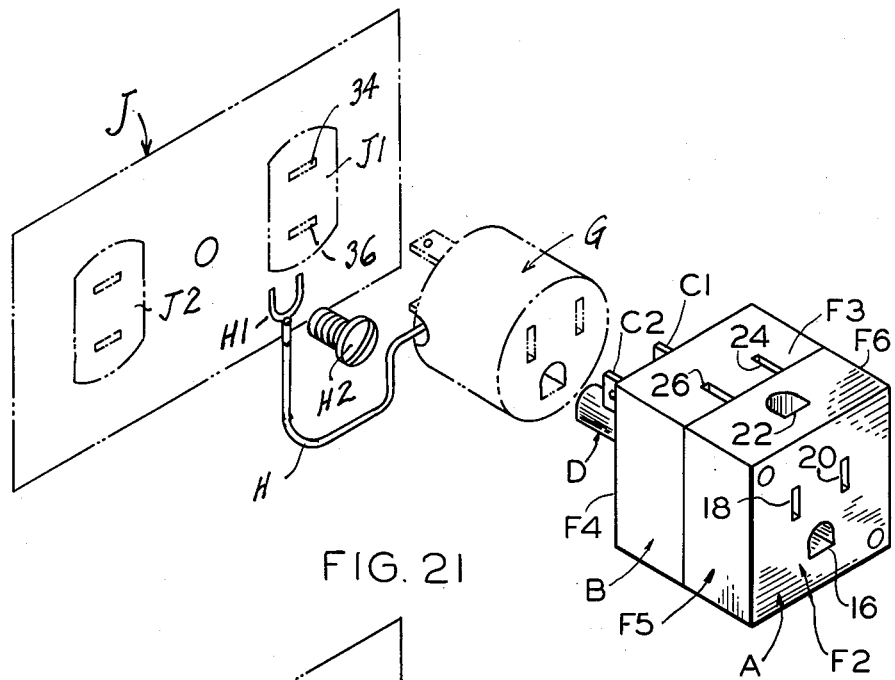
FIG. 21 is a perspective view of a cube tap wherein an intermediate member may be used to insert the cube tap of FIG. 1 in a different relative position to make all other outlets of the cube tap available.
Figure 22:
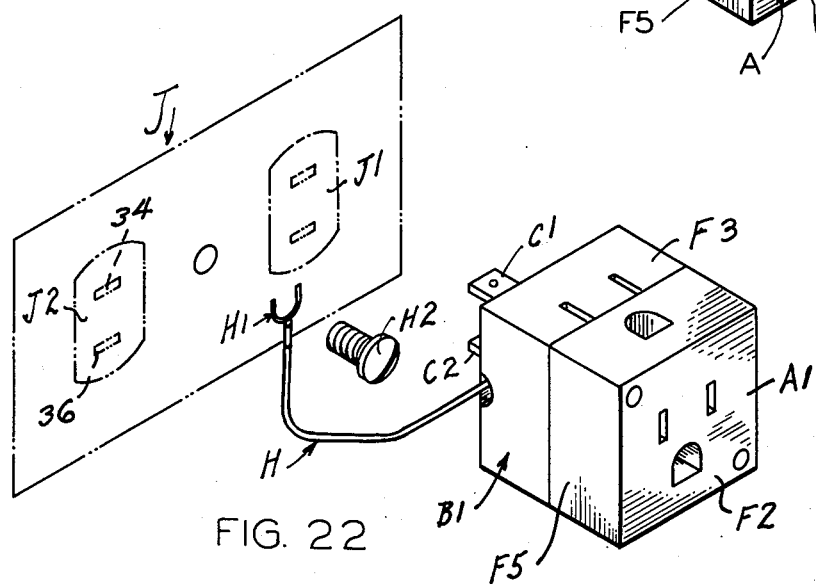
FIG. 22 is a perspective view of a cube tap embodying our invention wherein there is a flexible ground connection and wherein the external plug connection is shifted to a different relative position within the prongs shown in FIG. 2.

In FIG. 22 we have removed the rigid ground connection D and inserted a flexible ground connection H having a U-shaped holding lug H1, which may be attached to the wall convenience outlet J by means of a holding screw H2. A more important change has been the twisting of the terminals C1 and C2 to a position of 90° of that shown in FIGS. 2 and 21. In other words, the cube tap of FIG. 21 has the same face F1, F2, F3, F4, F5 and F6, but upon the face F4 the terminals C1 and C2 have been turned and the face F5 which is blank would be adjacent to a second cube tap that may be inserted in the second receptacle J2 of the two convenience outlet wall receptacles.

With this construction is provided, in FIGS. 21 and 22, the ability to utilize the cube tap so that all the receptacles may be properly used on the cube tap. It should be noted that the prongs C1 and C2 of the convenience receptacle interfit with the openings 34 and 36 of each of the receptacles J1 and J2 of the duplex receptacle J.

The ground connection unit D has a projecting prong of U-shaped configuration which is connected to one end of an offset strip 38 located within the interior of the two insulated sections A and B, see FIGS. 10, 12 and 18, and between the insulating strip G1 and G2. The U-shaped electrical contacts D1, D2 and D3 for receiving a complementary ground prong are electrically connected to the strip 38 by means of a rivet 40. The first electrical contact D1 is connected to the strip 38 to project downwardly as FIG. 12 is viewed. An intermediate angle strip 42 has the second electrical contact D2 connected to its free end. The third electrical contact D3 is joined to both an end of the strip 38 and one leg of the angle 42 whereby the same holding rivet holds the third electrical contact D3, the angle 42 and the strip 38 together.

In FIG. 18, the prong C1 comprises a strip of electrical conducting material to which is attached a pair of contact pieces 43 and 44. The two pieces 43 and 44 are spaced apart by the strip but are held together by a square rivet and a second rivet 32 holds the two pieces 43 and 44 together to provide greater resiliency.

Although our invention has been described in considerable detail, such description is intended as being illustrative rather than limiting, since the invention may be variously embodied, and the scope of the invention is to be determined as claimed.

We claim:

1. A cube tap comprising a cubical housing of electrically insulative material, said housing comprising a pair of cubical sections releasably connected to each other in face-to-face engagement and having complementary recesses therein which are in mating relationship with each other to form a plurality of internal compartments, an electrical contact assembly within each of said compartments, each of said contact assemblies comprising four interconnected contact elements wherein each element is substantially perpendicularly offset from the elements adjacent thereto and extends in an opposite direction from the element opposed thereto, three of the elements of each assembly each comprising opposing, spaced tongues positioned within said housing and being in alignment with corresponding access apertures in said housing while the fourth element on each assembly includes a contact which extends outwardly of said housing, one of said outwardly extending contacts being a ground contact while each of the other outwardly extending contacts is a live electrical contact, said assembly with said ground contact being a center assembly positioned between a pair of separable substantially rigid spaced insulating partitions, one of the other assemblies being spaced from said center assembly by one of said partitions and another of said other assemblies being spaced from said center assembly by the other partition.

2. The cube tap of claim 1 wherein said ground contact is a rigid prong.

3. The cube tap of claim 1 wherein said ground contact is a flexible cable provided with a connecting means at its outer end.

References Cited in the file of this patent

UNITED STATES PATENTS

| 1,615,302 | Hartmann | Jan. 25, 1927 |
| 2,298,342 | Brus | Oct. 13, 1942 |
| 2,682,646 | Hubbell | June 29, 1954 |
| 2,792,561 | Cohen | May 14, 1957 |

FOREIGN PATENTS

| 466,935 | Great Britain | June 8, 1937 |
| 684,110 | Great Britain | Dec. 10, 1952 |

OTHER REFERENCES

Barth (publication): "Electrical Construction and Maintenance," page 166, July 1954.